United States Patent
Mabuchi et al.

(10) Patent No.: US 11,095,179 B2
(45) Date of Patent: Aug. 17, 2021

(54) THERMOSETTING RESIN COMPOSITION, STATOR COIL OBTAINED USING SAME, AND ROTATING ELECTRIC MACHINE

(71) Applicant: Mitsubishi Electric Corporation, Chiyoda-ku (JP)

(72) Inventors: Takahiro Mabuchi, Chiyoda-ku (JP); Azusa Osawa, Chiyoda-ku (JP); Motoki Masaki, Chiyoda-ku (JP); Shinya Tokizaki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 276 days.

(21) Appl. No.: 16/098,222

(22) PCT Filed: Jul. 13, 2016

(86) PCT No.: PCT/JP2016/070643
§ 371 (c)(1),
(2) Date: Nov. 1, 2018

(87) PCT Pub. No.: WO2018/011904
PCT Pub. Date: Jan. 18, 2018

(65) Prior Publication Data
US 2019/0165632 A1    May 30, 2019

(51) Int. Cl.
*H02K 3/30* (2006.01)
*C08L 63/00* (2006.01)
(Continued)

(52) U.S. Cl.
CPC .............. *H02K 3/30* (2013.01); *C08K 3/013* (2018.01); *C08K 3/22* (2013.01); *C08L 63/00* (2013.01);
(Continued)

(58) Field of Classification Search
CPC ... H02K 3/30; H02K 3/34; C08K 3/22; C08K 2201/003; C08K 2201/011; C08L 63/00; C08L 2203/20
See application file for complete search history.

(56) References Cited

U.S. PATENT DOCUMENTS

| | | | | |
|---|---|---|---|---|
| 6,359,232 B1 * | 3/2002 | Markovitz | ............... | H01B 3/04 174/137 B |
| 7,547,847 B2 * | 6/2009 | Miller | ...................... | H01B 3/04 174/120 R |

(Continued)

FOREIGN PATENT DOCUMENTS

| | | |
|---|---|---|
| JP | 2006-57017 A | 3/2006 |
| JP | 2007-270099 A | 10/2007 |

(Continued)

OTHER PUBLICATIONS

Extended European Search Report dated Jun. 26, 2019 in corresponding European Patent Application No. 16908808.5, 7 pages.
(Continued)

*Primary Examiner* — Jeremy A Luks
(74) *Attorney, Agent, or Firm* — Xsensus LLP

(57) ABSTRACT

A thermosetting resin composition of the present disclosure includes an epoxy resin (1) containing a curing agent, and inorganic particles (2) having a rutile-type crystal structure and an average particle diameter of 500 nm or less. Further, a stator coil of the present disclosure includes a coil conductor (6), and an insulating layer (7) obtained by winding an insulating tape around the coil conductor (6), impregnating the insulating tape with the thermosetting resin composition, and molding the impregnated insulating tape by heating and pressurizing. In addition, a rotating electric machine of the present disclosure includes a stator core (4) having a slot (10), in which the stator coil (5) is accommodated. According to the present disclosure, it is possible to
(Continued)

obtain a thermosetting resin composition capable of achieving improvement in machine life through suppression of partial discharge and miniaturization and high output of the machine through improvement of a dielectric-breakdown electric field property, a stator coil obtained through use of the thermosetting resin composition, and a rotating electric machine.

4 Claims, 2 Drawing Sheets

(51) Int. Cl.
  *H02K 3/34* (2006.01)
  *C08K 3/22* (2006.01)
  *C08K 3/013* (2018.01)
  *C08K 9/06* (2006.01)
  *C08K 3/16* (2006.01)

(52) U.S. Cl.
  CPC ............... *H02K 3/34* (2013.01); *C08K 3/16* (2013.01); *C08K 9/06* (2013.01); *C08K 2201/003* (2013.01); *C08K 2201/011* (2013.01); *C08L 2203/20* (2013.01)

(56) References Cited

U.S. PATENT DOCUMENTS

| | | | |
|---|---|---|---|
| 7,803,457 B2* | 9/2010 | Irwin | ............... B32B 27/34 428/323 |
| 7,875,347 B2* | 1/2011 | Irwin | ............... H01L 21/3122 428/323 |
| 9,925,744 B2* | 3/2018 | Mabuchi | ............... B32B 5/16 |
| 9,928,935 B2* | 3/2018 | Yin | ............... H01B 3/30 |
| 10,351,728 B2* | 7/2019 | Takahara | ............... C08K 3/38 |
| 2011/0054072 A1 | 3/2011 | Sawada et al. | |
| 2011/0057228 A1 | 3/2011 | Taniguchi et al. | |
| 2012/0217532 A1 | 8/2012 | Fuke et al. | |
| 2016/0329127 A1* | 11/2016 | Hanawa | ............... H01F 27/32 |

FOREIGN PATENT DOCUMENTS

| | | | |
|---|---|---|---|
| JP | 2012-171975 A | 9/2012 | |
| JP | 2016-41827 A | 3/2016 | |
| JP | 2016-89157 A | 5/2016 | |
| JP | 2016-108499 A | 6/2016 | |
| WO | WO 2009/096365 A1 | 8/2009 | |
| WO | WO-2014109167 A1 * | 7/2014 | ............ B32B 19/02 |

OTHER PUBLICATIONS

International Search Report dated Aug. 30, 2016 in PCT/JP2016/070643 filed Jul. 13, 2016.

* cited by examiner

THERMOSETTING RESIN COMPOSITION, STATOR COIL OBTAINED USING SAME, AND ROTATING ELECTRIC MACHINE

TECHNICAL FIELD

The present disclosure relates to a thermosetting resin composition, a stator coil obtained through use of the thermosetting resin composition, and a rotating electric machine.

BACKGROUND ART

A stator of a rotating electric machine includes stator coils accommodated in a plurality of slots formed on an inner peripheral side of a stator core. Each of the stator coils includes a coil conductor and a stator coil insulator for covering the coil conductor. The stator coil is manufactured by winding an insulating tape in which a fiber reinforcing material, for example, glass cloth, is bonded to a mica sheet around the coil conductor several times, impregnating the insulating tape with a liquid thermosetting resin composition (insulating varnish) having low viscosity under reduced pressure, and heating the impregnated insulating tape while subjecting the impregnated insulating tape to press molding so as to obtain a predetermined sectional shape. Further, the stator coils are accommodated in two upper and lower stages in each of the slots, and electromagnetic vibration generated from the stator coils during operation of the rotating electric machine is suppressed by inserting a spacer between the stator coils and inserting a wedge for fixing the stator coil into an opening end portion of the slot.

In general, as described above, insulating tape and the like are used in the stator coil, and in order to fix the insulating tape and the like, they are subjected to impregnation-heating treatment through use of a thermosetting resin composition. Regarding the impregnation-heating treatment, the following has been known. It is important that the thermosetting resin composition be filled into gaps of the insulating tape and the like, and with this, it has been known that mechanical characteristics and electric insulation characteristics of the insulating tape and the like can be enhanced.

Further, during operation of a rotating electric machine, the stator coil insulator is placed in an environment in which the stator coil insulator is constantly exposed to high electric stress. Still further, it has been known that in general, rotating electric machines are used for long periods of several years or longer, and voids are generated in resin of the insulator due to long-term thermal and mechanical stress, and that partial discharge occurs in the voids under high-voltage environments, and that the resin of the insulator is decomposed due to repeated discharge, with the result that machine life is influenced. Considering that there is a demand for greater reliability in machine life in the future, a thermosetting resin composition has been developed having mixed therein nanoparticles with which gaps in the insulating tape and the like can be impregnated, in order to improve machine life through suppression of partial discharge.

In view of the foregoing, in order to improve partial discharge properties through addition of nanoparticles, there has been proposed an epoxy-based insulating resin composition in which oxide-based nanoparticles such as titanium oxide, having a primary particle diameter of 500 nm or less and having a surface coated with silica are filled in a ratio of from 1 part to 50 parts with respect to 100 parts of the epoxy resin (see Patent Document 1).

CITATION LIST

Patent Document

[Patent Document 1] JP 2006-057017 A

SUMMARY OF INVENTION

Technical Problem

In addition to the above-mentioned improvement of the partial discharge properties, in recent years, there has been a demand for miniaturization and high output of rotating electric machines. In order to achieve this, increases in voltage applied to the insulating material for the rotating electric machines are inevitable, and hence an increase in withstand voltage of the insulating material is required, particularly, to improve the dielectric-breakdown electric field properties thereof.

In conventional insulating resin compositions, partial discharge can be suppressed by adding nanoparticles, and the product life of a machine can be improved. However, due to the configuration in which oxide-based nanoparticles such as titanium oxide, are coated with silica, the dielectric-breakdown electric field property is not improved, and hence miniaturization and high output of rotating electric machines cannot be achieved.

The present disclosure has been made to solve the above-mentioned problems, and an object of the present disclosure is to obtain a thermosetting resin composition capable of achieving improvement of machine life through suppression of partial discharge and miniaturization and high output of a machine through improvement of the dielectric-breakdown electric field properties, a stator coil obtained through use of the thermosetting resin composition, and a rotating electric machine.

Solution to Problem

According to the present disclosure, there is provided a thermosetting resin composition including: an epoxy resin containing a curing agent; and inorganic particles having a rutile-type crystal structure and an average particle diameter of 500 nm or less.

Advantageous Effects of Invention

According to the present disclosure, a thermosetting resin composition excellent in partial discharge resistance and dielectric-breakdown electric field property, a stator coil obtained through use of the thermosetting resin composition, and a rotating electric machine can be obtained.

DESCRIPTION OF EMBODIMENTS

First Embodiment

Figure 1:
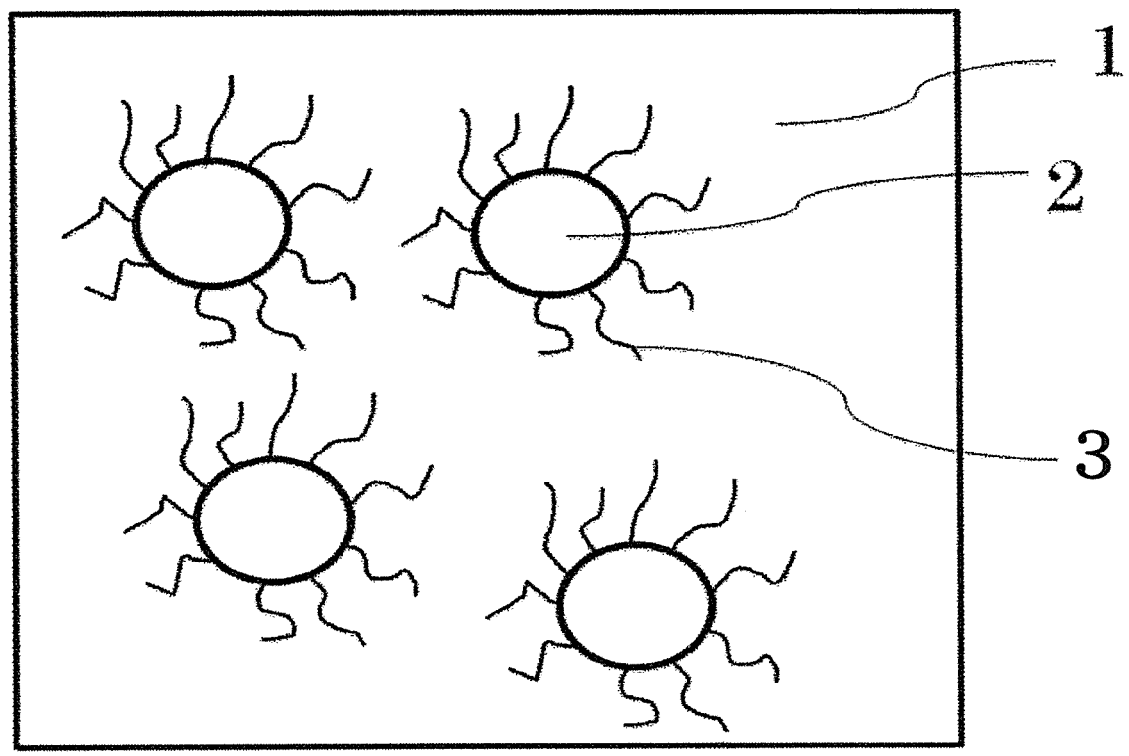
FIG. 1 is a schematic sectional view of a thermosetting resin composition according to a first embodiment of the present invention.

FIG. 1 is a schematic sectional view for illustrating a configuration of a thermosetting resin composition according to a first embodiment of the present invention. The basic configuration of the thermosetting resin composition according to the first embodiment is described with reference to FIG. 1. The thermosetting resin composition according to the first embodiment has a feature of including an epoxy resin 1 containing a curing agent and inorganic particles 2 having an average particle diameter of 500 nm or less and having a rutile-type crystal structure.

Now, specific examples of the epoxy resin 1 containing a curing agent are described. The epoxy resin 1 contains an epoxy group in its skeleton, and specific examples thereof include a bisphenol A-type epoxy resin, a bisphenol F-type epoxy resin, a bisphenol S-type epoxy resin, a biphenol-type epoxy resin, a phenol novolac-type epoxy resin, a cresol novolac-type epoxy resin, a bisphenol A-type novolac-type epoxy resin, a bisphenol F-type novolac-type epoxy resin, an alicyclic epoxy resin, an aliphatic chain epoxy resin, a glycidyl ester-type epoxy resin, a glycidyl amine-type epoxy resin, a hydantoin-type epoxy resin, an isocyanurate-type epoxy resin, a salicylaldehyde novolac-type epoxy resin, diglycidyl etherified products of other bifunctional phenols, and diglycidyl etherified products of bifunctional alcohols, and halogenated products and hydrogenated products thereof. The resins may be used in combination thereof. Further, from the viewpoint of balance in cost, viscosity, and heat resistance, a reaction product of epichlorohydrin and a bisphenol A compound is preferred. As product examples thereof, there are given: Epicoat (trademark) 828 and Epicoat (trademark) 825 (product names, manufactured by Japan Epoxy Resins Co., Ltd.); Epotohto (trademark) YD128 (product name, manufactured by Tohto Kasei Co., Ltd.); Epiclon (trademark) 50 (product name, manufactured by DIC Corporation); and Sumi-epoxy (trademark) ELA-128 (product name, manufactured by Sumitomo Chemical Co., Ltd.).

Further, in order to timely impart heat resistance to an epoxy resin in response to heat generation during operation of a machine, an epoxy resin having three or more epoxy groups may be used alone or in combination with the above-mentioned epoxy resins. Examples of the epoxy resin having three or more epoxy groups include resorcinol diglycidyl ether (1,3-bis-(2,3-epoxypropoxy)benzene), diglycidyl ether of bisphenol A (2,2-bis(p-(2,3-epoxypropoxy)phenyl) propane), triglycidyl p-aminophenol (4-(2,3-epoxypropoxy)-N, N-bis(2,3-epoxypropyl)aniline), diglycidyl ether of bromobisphenol A (2,2-bis(4-(2,3-epoxypropoxy)-3-bromo-phenyl)propane), diglycidyl ether of bisphenol F (2,2-bis(p-(2,3-epoxypropoxy)phenyl)methane), triglycidyl ether of m- and/or p-aminophenol (3-(2,3-epoxypropoxy)-N, N-bis(2,3-epoxypropyl)aniline), and tetraglycidyl methylene dianiline (N,N, N',N'-tetra(2,3-epoxypropyl)-4,4'-diaminodiphenylmethane), cresol novolac epoxy, and phenol novolac epoxy. Although the above-mentioned resins can enhance heat resistance in accordance with an addition amount thereof, in general, those resins have high viscosity and cause an increase in viscosity of the resin composition. Therefore, a balance between the addition amount and the heat resistance is required. From this viewpoint, phenol novolac epoxy or cresol novolac epoxy is particularly preferred.

Next, specific examples of the curing agent are described below. The curing agent is not particularly limited as long as the curing agent can react with the epoxy resin to cure the epoxy resin, and there are given, for example, the following acid anhydrides, amine-based compounds, and imidazole-based compounds.

For example, as the acid anhydrides, there are given hexahydrophthalic anhydride, tetrahydrophthalic anhydride, methylhexahydrophthalic anhydride, methyltetrahydrophthalic anhydride, and methylnadic anhydride. The acid anhydrides may be used alone or in combination thereof. It is preferred that the acid anhydride be a liquid at normal temperature (25° C.). When the acid anhydride is a liquid at normal temperature (25° C.), the viscosity of the thermosetting resin composition can be decreased, and hence impregnability of the thermosetting resin composition can be enhanced. There is no particular limitation on the blending amount of the acid anhydride, and it is only required that the blending amount be appropriately adjusted in accordance with the kind of the acid anhydride to be used. The blending amount of the acid anhydride is preferably from 10 parts by mass to 150 parts by mass, more preferably from 30 parts by mass to 120 parts by mass, still more preferably from 50 parts by mass to 100 parts by mass with respect to 100 parts by mass of a bisphenol-type epoxy resin. With such blending amount, the thermosetting resin composition can be appropriately cured. There is no particular limitation on the equivalent ratio of an acid anhydride group of the acid anhydride with respect to an epoxy group of the bisphenol-type epoxy resin, and the equivalent ratio is preferably from 0.7 to 1.3, more preferably from 0.8 to 1.2, still more preferably from 0.9 to 1.1. When the equivalent ratio is less than 0.7, the viscosity of the thermosetting resin composition is liable to be increased. As a result, in order to ensure the impregnability of the thermosetting resin composition, it is required to increase the temperature, and the pot life of the thermosetting resin composition is shortened in some cases. Meanwhile, when the equivalent ratio is more than 1.3, for example, the heat resistance of a cured product is liable to be decreased.

In addition, examples of the amine-based curing agent include, but not limited to, ethylenediamine, 1,3-diaminopropane, 1,4-diaminobutane, hexamethylenediamine, dipropylenediamine, polyetherdiamine, 2,5-dimethylhexamethylenediamine, trimethylhexamethylenediamine, diethylenetriamine, iminobispropylamine, bis(hexamethyl) triamine, triethylenetetramine, tetraethylenepentamine, pentaethylenehexamine, aminoethylethanolamine, tri(methylamino)hexane, dimethylaminopropylamine, diethylaminopropylamine, methyliminobispropylamine, menthenediamine, isophoronediamine, bis(4-amino-3-methyldicyclohexyl)methane, diaminodicyclohexylmethane, bis (aminomethyl)cyclohexane, N-aminoethylpiperazine, 3,9-bis(3-aminopropyl)-2,4,8,10-tetraoxaspiro(5.5)undecane, m-xylenediamine, m-phenylenediamine, diaminodiphenylmethane, diaminodiphenyl sulfone, diaminodiethyldiphenylmethane, dicyandiamide, and organic acid dihydrazides.

In addition, examples of the imidazole-based curing agent include, but not limited to, 2-methylimidazole, 2-undecylimidazole, 1,2-dimethylimidazole, 2-ethyl-4-methyl imidazole, 2-heptadecylimidazol, 2-phenylimidazole, 2-phenyl-4-methylimidazole, 1-benzyl-2-methylimidazole, and 1-benzyl-2-phenylimidazole.

When the viscosity is high and the impregnability is decreased at a time of mixing of the epoxy resin 1 and the curing agent, a reactive diluent is added in order to decrease the viscosity, so that the viscosity can be appropriately adjusted. In particular, in a case of an application requiring impregnability, for example, where the coil length exceeds 1 m, or in a case where it is assumed that a process will have difficulty in reducing resin viscosity by heating during impregnation, it is preferred to use the following reactive diluent. As the reactive diluent, a styrene monomer, a monomer having a functional group of a hydrocarbon added to a phenyl group thereof, a methacrylic monomer, or an acrylic monomer may be used. There is no particular limitation on the (meth)acrylic monomer as long as the (meth) acrylic monomer can decrease the viscosity without impairing the characteristics of the epoxy resin, and a linear (meth)acrylate, a branched (meth)acrylate, a cyclic (meth) acrylate, and the like may be used. Of those, from the viewpoint of heat resistance and a decrease in viscosity, a linear (meth)acrylate is preferred. Examples of the linear (meth)acrylate include 2-ethylhexyl acrylate, cyclohexyl acrylate, diethylene glycol mono-2-ethylhexyl ether acrylate, diethylene glycol monophenyl ether acrylate, tetraethylene glycol monophenyl ether acrylate, trimethylolpropane triacrylate, lauryl acrylate, lauryl methacrylate, isobornyl acrylate, isobornyl methacrylate, 2-phenoxyethyl acrylate, tetrahydrofurfuryl acrylate, 2-hydroxypropyl acrylate, benzyl acrylate, tetrahydrofurfuryl methacrylate, 2-hydroxyethyl methacrylate, benzyl methacrylate, cyclohexyl methacrylate, and 2-(2,4,6-tribromophenoxy)ethyl acrylate. Those linear (meth)acrylates may be used alone or in combination thereof. There is no particular limitation on the blending amount of the reactive diluent, and it is only required that the blending amount be appropriately adjusted. When the reactive diluent is blended within a range not impairing the heat resistance of the epoxy resin, the blending amount is preferably from 50 parts by mass to 310 parts by mass, more preferably from 70 parts by mass to 250 parts by mass, still more preferably from 100 parts by mass to 200 parts by mass with respect to 100 parts by mass of the bisphenol-type epoxy resin. With such blending amount, the viscosity of the epoxy resin composition can be decreased.

Next, the inorganic particles 2 having a rutile-type crystal structure and an average particle diameter of 500 nm or less are described. The inorganic particles according to the first embodiment must have an insulating property, and the crystal structure thereof must be of a rutile type from the viewpoint of dielectric-breakdown electric field properties. Examples of the rutile-type inorganic particles 2 include $MF_2$ (M=Mg, Mn, Fe, Co, Ni, Pd, Zn), $CaCl_2$, $CaBr_2$, and $MO_2$ (M=Ti, Ge, Sn, Pb, V, Nb, Ta, Cr, Mo, W, Mn, Ir). Of those, particles represented by $MO_2$ are excellent from the viewpoint of cost, availability, and handleability.

The inorganic particles 2 with a rutile-type crystal have a hexagonal close-packed structure in which packing of anions is distorted, and half of the octahedral voids are occupied by cations. With this crystal structure, it is assumed that cations are regularly arranged at an interface between the inorganic particles 2 and the epoxy resin 1 containing a curing agent, and electron carriers flowing to the resin at the time of dielectric breakdown are trapped at an interface between the resin and the particles, with the result that the dielectric-breakdown electric field property is improved.

The average particle diameter of the inorganic particles 2 according to the first embodiment is characterized in that D50 in a median diameter (50% diameter, D50) is 500 nm or less. For example, as a measurement method, a laser diffraction scattering method particle size distribution device (for example, Microtrac (product name), Model: MT3300) is used in some cases. The interparticle distance is enlarged as the particle diameter is increased, and hence the probability of trapping electrons is liable to be decreased at the time of partial discharge. Therefore, the median diameter must be 500 nm or less in order to improve partial discharge resistance. Through use of the inorganic particles 2 having the above-mentioned median diameter, a resin excellent in partial discharge resistance can be provided. When the particle diameter is decreased, the viscosity is liable to be increased at the time of adding the inorganic particles to the resin. Further, it is more desirable that the median diameter be 300 nm or less in consideration of impregnability in the gaps of electric wire or tape. From the above-mentioned viewpoints of the viscosity and the impregnability, it is more desirable that the particle diameter of the inorganic particles fall within a range of from 10 nm to 300 nm.

The inorganic particles may be represented by $MX_2$ (M: cations, X: anions), and insulating inorganic particles particularly effective for improving the dielectric-breakdown electric field property have a chemical composition represented by $MO_2$. Regarding the ionic radius thereof (Shannon's ionic radius), when M (metal atom) is tetravalent and has a coordination number of 6, and O (oxygen atom) is divalent and has a coordination number of 3, it is desired that the ratio (ionic radius ratio) of an ionic radius of M to an ionic radius of O falls within a range of from 0.40 to 0.51 (ionic radius of M/ionic radius of O is from 0.40 to 0.51). As metal atoms having an ionic radius ratio within this range, there are given Ti, Sn, Mo, Nb, Ta, Cr, W, and Ir. With this, in particular, trapping of electrons serving as carriers of the dielectric-breakdown electric field property at an interface between the resin and the inorganic particles functions effectively. It is assumed that the arrangement of cations and anions and the particular ionic radius ratio influence the probability of electron trapping. Of the above-mentioned metal atoms, there are given Ti, Sn, and Cr as metal atoms that have an ionic radius ratio within the above-mentioned range and are used as an insulating material.

It is more preferred that the blending amount of the inorganic particles 2 fall within a range of from 1 vol % to 50 vol % with respect to the total amount of the epoxy resin 1 containing a curing agent defined as 100. When the blending amount is less than 1 vol %, the partial discharge resistance cannot be imparted in some cases. Meanwhile, when the blending amount is more than 50 vol %, the viscosity of the epoxy resin 1 is increased, and it becomes difficult for the inorganic particles 2 to be uniformly dispersed in the epoxy resin 1 in some cases. Further, an inconvenience occurs where the impregnability is decreased, and the resin does not fill into the gaps of a tape or an electric wire.

The inorganic particles 2 are present while being dispersed in the epoxy resin 1, and carrier electrons of dielectric breakdown are trapped at the interface with respect to the epoxy resin 1. Therefore, the probability of trapping electrons is increased due to an increase in interface area. Further, in order to improve the partial discharge resistance and the dielectric-breakdown electric field property, the probability of the inorganic particles 2 being present is an important parameter, and hence it is desired that the inorganic particles 2 be singly dispersed as primary particles to increase the interface area. Therefore, the dispersion of the inorganic particles 2 in the epoxy resin 1 is important, and in order to realize this dispersion, it is desired that organic modifying groups 3 be added to each surface of the inorganic particles 2 through use of a coupling agent, a surface treatment agent, or the like on each surface of the inorganic particles 2. Examples of such surface treatment agent may include: silane coupling agents, such as γ-glycidoxy-propyltrimethoxysilane, γ-aminopropyl-trimethoxysilane, vinyltriethoxysilane, 3-methacryloxypropyltrimethoxysilane, and 3-glycidyloxypropyl-trimethoxysilane; coupling agents, such as a titanate-based coupling agent and an aluminum-based coupling agent; and aluminum laurate, aluminum stearate, iron stearate, aluminum hydroxide, alumina, silica, zirconia, and silicone.

In general, although as the surface treatment agent, there are surface treatment agents called inorganic compound-based surface treatment agents such as silica or alumina used in Patent Document 1 and surface treatment agents called organic compound-based surface treatment agents, in the configuration of the thermosetting resin composition according to the first embodiment, the organic compound-based surface treatment agent is desired. It is assumed that, in a process in which the carrier electrons of dielectric breakdown are trapped at the interface between the epoxy resin 1 and the inorganic particles 2, the transfer time of the electrons between the epoxy resin 1 and the inorganic particles 2 is related to a HOMO-LUMO level or a bandgap difference between a conduct ion band and a valence band of the inorganic particles 2 and the epoxy resin 1. In particular, on the surface of an inorganic particle to which the inorganic compound-based surface treatment agent is applied, the gap difference is liable to be decreased. Therefore, when the inorganic compound-based surface treatment agent is applied to inorganic particles, the probability of trapping electrons is decreased at the time of dielectric breakdown or partial discharge, and hence an undesirable tendency is liable to occur.

Further, the interface becomes a mechanical weak point, and cracks occur at the interface due to mechanical stress over time, with the result that the strength of a material is decreased in some cases. In the epoxy resin 1, the cross-linking of the resin proceeds due to a curing reaction, and a three-dimensional chemical bond is formed, with the result that the epoxy resin 1 has high mechanical strength. Meanwhile, when the interface has no functional group that reacts with the epoxy resin 1 on particle surfaces, the interface has no chemical bond. Therefore, as compared with the resin, the interface is mechanically weak. Therefore, when thermal stress caused by suspension of operation of a rotating electric machine is applied over time, the interface is liable to be broken first. Thus, particularly from the viewpoint of maintaining the strength of a material, it is more preferred that an organic modifying group 3 on the surface of the inorganic particle 2 have a structure represented by —O—(Y)-(A)-phenyl (Y). In this case, (Y) represents Si or Ti, and (A) is absent or represents a C1 to C6 alkyl group or a structure obtained by substituting a part of hydrogen atoms thereof by NH. In particular, this structure has a phenyl group having high affinity with the epoxy resin, and hence the organic modifying group is entangled with the structure of a three-dimensional chemical bond of the resin at a molecular level, with the result that the strength of a material can be maintained at the interface.

In Table 1, partial discharge resistance and a dielectric-breakdown electric field property in each of the Examples and Comparative Examples in the first embodiment are shown.

TABLE 1

|  |  | Example 1 | Example 2 | Example 3 | Example 4 | Example 5 | Example 6 |
|---|---|---|---|---|---|---|---|
| Inorganic particle parameters | Kind | GeO2 | CrO2 | TiO2 | SnO2 | SnO2 | SnO2 |
|  | Crystal structure | Rutile | Rutile | Rutile | Rutile | Rutile | Rutile |
|  | Particle diameter (nm) | 50 | 50 | 50 | 50 | 50 | 50 |
|  | Ionic radius ratio | 0.39 | 0.4 | 0.45 | 0.51 | 0.51 | 0.51 |
|  | Blending ratio | 20 | 20 | 20 | 20 | 45 | 55 |
| Thermosetting resin composition Characteristics | Dielectric-breakdown electric field ratio | ○ | ◎ | ◎ | ◎ | ◎ | ◎ |
|  | Depth of erosion caused by partial discharge | ○ | ◎ | ◎ | ○ | ◎ | ○ |
|  | Impregnability | ○ | ○ | ○ | ○ | ○ | X |

|  |  | Example 7 | Example 8 | Example 9 | Example 10 | Example 11 | Example 12 |
|---|---|---|---|---|---|---|---|
| Inorganic particle parameters | Kind | TiO2 | TiO2 | TiO2 | PbO2 | TiO2 | TiO2 |
|  | Crystal structure | Rutile | Rutile | Rutile | Rutile | Rutile | Rutile |
|  | Particle diameter (nm) | 300 | 490 | 500 | 50 | 350 | 500 |
|  | Ionic radius ratio | 0.45 | 0.45 | 0.45 | 0.57 | 0.45 | 0.39 |
|  | Blending ratio | 20 | 20 | 20 | 20 | 20 | 20 |
| Thermosetting resin composition Characteristics | Dielectric-breakdown electric field ratio | ◎ | ◎ | ◎ | ○ | ◎ | ○ |
|  | Depth of erosion caused by partial discharge | ○ | ○ | ○ | ○ | ○ | ○ |
|  | Impregnability | ○ | ○ | ○ | ○ | X | ○ |

|  |  | Comparative example 1 | Comparative example 2 | Comparative example 3 | Comparative example 4 | Comparative example 5 | Comparative example 6 |
|---|---|---|---|---|---|---|---|
| Inorganic particle parameters | Kind | Absent | SiO2 | TiO2 | Al2O3 | TiO2 | TiO2 |
|  | Crystal structure | — | Quartz | Anatase | Spinel | Rutile | Rutile |
|  | Particle diameter (nm) | — | 50 | 50 | 50 | 510 | 550 |
|  | Ionic radius ratio | — | — | — | — | 0.45 | 0.45 |
|  | Blending ratio | 0 | 20 | 20 | 20 | 20 | 20 |
| Thermosetting resin composition Characteristics | Dielectric-breakdown electric field ratio | X | X | X | X | X | X |
|  | Depth of erosion caused by partial discharge | X | ○ | ◎ | ○ | ○ | ○ |
|  | Impregnability | ○ | ○ | ○ | ○ | X | X |

In Example 1 of Table 1, bisphenol A-type epoxy and hexahydrophthalic anhydride were blended in a weight ratio of 100:90, and further, inorganic particles were blended in the mixture in accordance with Table 1. The resultant was mixed by a planetary centrifugal mixer. In this case, the blending ratio of Table 1 represents a volume content (vol %) with respect to a resin and a curing agent. The obtained mixture was subjected to vacuum deaeration treatment and then heated at 120° C. for 4 hours to produce a cured product of a thermosetting resin composition. The cured product was determined for a dielectric-breakdown electric field in accordance with JIS C 2110-1. That is, the strength ratio was determined under a condition in which the dielectric-breakdown electric field of a cured product formed of an epoxy resin and a curing agent, which did not contain inorganic particles, was defined as 1. In this case, a strength ratio of 1.8 or more, with which miniaturization of a rotating machine could be sufficiently realized, was defined as ⊚, a strength ratio of from 1.4 to less than 1.8, with which the miniaturization could be realized, was defined as ○, and a strength ratio of from 1 to less than 1.4, with which the miniaturization could not be easily realized, was defined as X. Further, in order to evaluate a partial discharge property, the surface of the cured product processed into a flat plate was polished, and then the surface of the cured product was eroded through partial discharge by application of a predetermined voltage for 24 hours through use of rod electrodes. The surface roughness of the cured product at this time was measured with a laser microscope to determine the maximum depth of erosion. That is, a depth ratio was determined under a condition in which the maximum depth of erosion of the cured product formed of the epoxy resin and the curing agent, which did not contain the inorganic particles, was defined as 10. In this case, a depth ratio of 5 or less, with which reliability of insulation of the rotating machine with respect to partial discharge could be sufficiently improved, was defined as ⊚, a depth ratio of from 5 to 8, with which the reliability was slightly improved, was defined as ○, and a depth ratio of from 8 to 10, with which the reliability was not expected to be improved, was defined as x. Further, in order to evaluate impregnability, a mica tape having a thickness of 120 μm was wound around a conductor ten times in a half overlaid state to prepare a simulated coil having a length of 60 cm. Then, a mixture of a resin, a curing agent, and inorganic particles was heated to 60° C. and the simulated coil was impregnated therewith for 5 hours under a vacuum state and pressure reduced to 1 torr. The cross section of the center portion of the simulated coil was observed with a stereoscopic microscope to confirm whether or not gaps of the tape were impregnated with the resin composition. The case in which the gaps of the tape were impregnated without voids was determined as ○, and the case in which there was a portion that was not impregnated was determined as X. The partial discharge resistance of the thermosetting resin composition is related to "depth of erosion caused by partial discharge", and the dielectric-breakdown electric field property is related to "dielectric-breakdown electric field ratio".

In Examples 2 to 12 and Comparative Examples 1 to 6 of Table 1, blending was also performed based on Table 1, and the same evaluations as those of Example 1 were made. That is, the conditions except for the use of the inorganic particles of Table 1 were set to the same. As a result, in Example 1, the maximum depth of erosion was small, and the improvement of the partial discharge resistance was observed as compared to those of Comparative Example 1. Further, it was confirmed that the dielectric-breakdown electric field was improved. Further, in Examples 2 to 12, it was confirmed that the above-mentioned characteristics were improved. Meanwhile, in Comparative Examples 1 to 6, particle diameter, ionic radius ratio, blending ratio, and the like were not optimized, and there were problems in characteristics in any of the partial discharge resistance, the dielectric-breakdown electric field property, and the impregnability. From the foregoing, it is understood that the thermosetting resin composition according to the first embodiment is excellent in partial discharge resistance and dielectric-breakdown electric field property and hence can improve machine life and enable miniaturization and high output of the machine.

Second Embodiment

Figure 2:
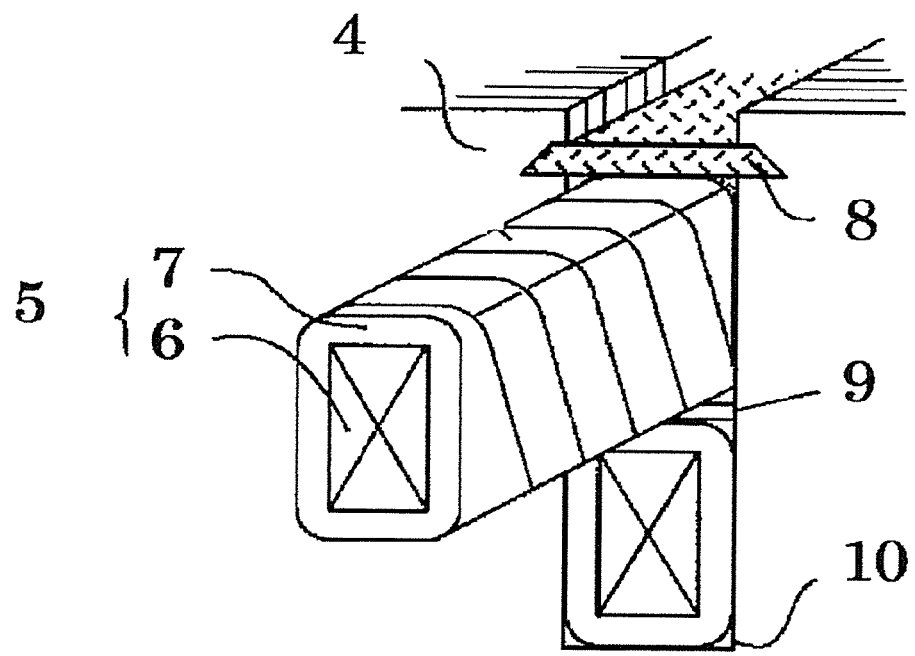
FIG. 2 is a partially enlarged perspective view of a stator of a rotating electric machine.

A stator coil according to a second embodiment of the present invention includes a coil conductor and an insulating layer integrated with the coil conductor by winding an insulating tape around an outer peripheral portion of the coil conductor, impregnating the insulating tape with the thermosetting resin composition of the present disclosure, and curing the impregnated insulating tape by heating and pressurizing. The stator coil according to the second embodiment has a feature in the thermosetting resin composition to be used, and as the other configurations thereof, conventionally known configurations (for example, the configuration illustrated in FIG. 2) may be employed. As illustrated in FIG. 2, in a stator of a rotating electric machine, stator coils 5 each including a coil conductor 6 and an insulating layer 7 are accommodated in two upper and lower stages in a plurality of slots 10 formed on an inner peripheral side of a stator core 4. A spacer 9 is inserted between the stator coils 5, and a wedge 8 for fixing the stator core 5 is inserted in an opening end portion of the slot 10.

The stator coil 5 having the above-mentioned structure is manufactured as follows. First, an insulating tape is wound around an outer peripheral portion of the coil conductor 6 formed of a plurality of insulated and coated element wire conductors a plurality of times so that a part of the insulating tape (for example, a half portion of a width of the insulating tape) overlaps. In this case, there is no particular limitation on the element wires forming the coil conductor 6 as long as the element wires have conductivity, and element wires made of copper, aluminum, silver, or the like may be used.

Next, the insulating tape wound around the coil conductor 6 is impregnated with a thermosetting resin composition. As the thermosetting resin, the same thermosetting resin as that exemplified in the first embodiment is used. As examples of an impregnation method, there are given vacuum impregnation, vacuum pressurizing impregnation, normal pressure impregnation, and the like. There is no particular limitation on the condition for impregnation, and it is only required that the condition be appropriately adjusted in accordance with the kinds of thermosetting resin composition and the like to be used. Further, when an electric wire having an insulating coating film is used instead of a flat metal element wire, the insulating tape need not be provided. After the insulating tape is impregnated with the thermosetting resin composition, the coil conductor 6 is clamped from outside of the insulating tape so that pressure is applied to the insulating tape. Next, the insulating tape is heated and pressurized to cure the thermosetting resin composition with which the insulating tape is impregnated so that an insulating layer is formed. With this, the stator coil 5 is obtained.

The stator coil 5 according to the second embodiment manufactured as described above is excellent in partial discharge resistance and dielectric-breakdown electric field property of the resin, and hence can improve machine life and enable miniaturization and high output of the machine. The present disclosure is not directly limited to the above-mentioned embodiments and may be embodied by modifying components within a range not departing from the spirit of the present disclosure in an implementation stage. Further, various inventions may be made through appropriate combination of a plurality of components disclosed in the above-mentioned embodiments. For example, some components may be eliminated from all the components described in the embodiments. Further, the components in the different embodiments may be appropriately combined.

Third Embodiment

Description is given of an embodiment in which the thermosetting resin composition according to the first embodiment is applied to coil insulation of a rotating electric machine, for example, a turbine generator. In the stator coil 5 of this power generator, the coil described in the second embodiment is used. FIG. 3(a) and FIG. 3(b) are each a schematic sectional view of the power generator as one example of the rotating electric machine. FIG. 3(a) is a sectional view taken along the line 1a-1a of FIG. 3(b) extending straight to a rotation shaft of the power generator as one example of the rotating electric machine. FIG. 3(b) is a sectional view for illustrating a cross section along the rotation shaft of the power generator as one example of the rotating electric machine. In FIG. 3(a) and FIG. 3(b), a stator of the rotating electric machine includes a cylindrical stator core 4, a plurality of (eight in this example) core fastening members 12, a plurality of (four in this example) retaining rings 13, a cylindrical frame 14, a plurality of (five in this example) ring-shaped middle frame members 15, a plurality of (four in this example) elastic support members 16, and the like. The stator core 4 accommodates a rotator (not shown). The core fastening members 12 are provided in an outer peripheral portion of the stator core 4 at predetermined intervals in a circumferential direction of the stator core 4 and fasten the stator core 4 in an axial direction thereof. The retaining rings 13, which are flat in the axial direction, are provided in the outer peripheral portion of the stator core 4 at a predetermined interval in the axial direction and retain the stator core 4 by fastening the stator core 4 in a center portion direction thereof from above the core fastening members 12. The frame 14 surrounds the periphery of the stator core 4 at an interval. The middle frame members 15 are provided at predetermined intervals in the axial direction so as to protrude from an inner surface of the frame 14 in an axial center direction. The elastic support members 16 are formed of spring plates each being fixed to the adjacent middle frame members 15 and fixed to the retaining rings 13 at each center portion in the axial direction of the adjacent middle frame members 15.

Figure 3:
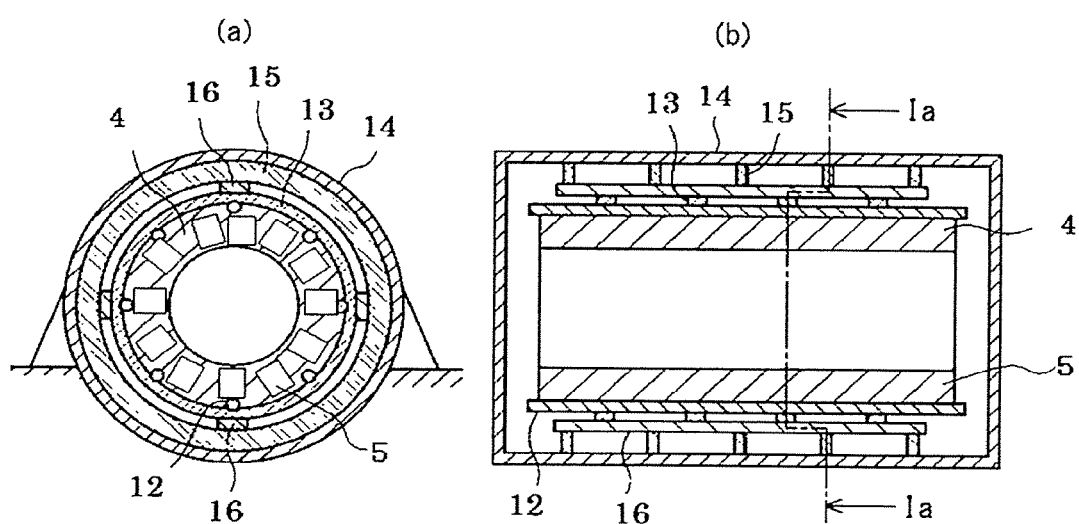
FIG. 3($a$) and FIG. 3($b$) are each a schematic sectional view of a power generator as one example of a rotating electric machine.

The stator illustrated in FIG. 3 forms, for example, an armature of the turbine generator. In the inner peripheral portion of the stator core 4, slots formed in the axial direction are arranged in a predetermined number in the circumferential direction, and the stator coils 5 are arranged in the slots as illustrated in FIG. 2. In the rotating electric machine, for example, the turbine generator, higher output and further miniaturization are required. In order to achieve high output and miniaturization, the insulating performance of a coil insulator must be improved. Through application of the resin composition according to the present disclosure to the stator coil of the rotating electric machine, the effect of achieving higher output and further miniaturization can be expected. Further, those coils are generally used in combination with resin, an insulating tape, and the like, and a rotating electric machine excellent in partial discharge resistance and dielectric-breakdown electric field property can be obtained by employing the configuration of the thermosetting resin composition described in the first embodiment.

REFERENCE SIGNS LIST 1 epoxy resin (containing curing agent)
2 inorganic particle
3 organic modifying group on surface of inorganic particle
4 stator core
5 stator coil
6 coil conductor
7 insulating layer
8 wedge
9 spacer
10 slot
12 core fastening member
13 retaining ring
14 frame
15 middle frame member
16 elastic support member

The invention claimed is:

1. A stator coil comprising a cured product of a thermosetting resin composition, wherein the thermosetting resin composition comprises:
an epoxy resin comprising a curing agent; and
inorganic particles having a rutile-type crystal structure and an average particle diameter of 500 nm or less,
wherein a blending amount of the inorganic particles is from 20 vol % to 50 vol % with respect to a total amount of the epoxy resin and the curing agent defined as 100 vol %.

2. The stator coil according to claim 1, wherein the inorganic particles have a chemical composition of $MO_2$, where M represents a metal atom and O represents an oxygen atom, with a ratio of an ionic radius of M to an ionic radius of O falling within a range of from 0.40 to 0.51.

3. A stator coil, comprising:
a coil conductor; and
an insulating layer obtained by winding an insulating tape around the coil conductor; impregnating the insulating tape with a thermosetting resin composition comprising (i) an epoxy resin comprising a curing agent, and (ii) inorganic particles having a rutile-type crystal structure and an average particle diameter of 500 nm or less, wherein a blending amount of the inorganic particles is from 20 vol % to 50 vol % with respect to a total amount of the epoxy resin and the curing agent defined as 100 vol %; and molding the impregnated insulating tape by heating and pressurizing.

4. A rotating electric machine, comprising a stator core having a slot, in which the stator coil of claim 3 is accommodated.

* * * * *